United States Patent [19]

Gresham

[11] Patent Number: 4,886,403

[45] Date of Patent: Dec. 12, 1989

[54] TIE DOWN APPARATUS FOR WHEELCHAIR

[76] Inventor: Gerald L. Gresham, 30800 Wixom Rd., Wixom, Mich. 48096

[21] Appl. No.: 165,916

[22] Filed: Mar. 9, 1988

[51] Int. Cl.$^4$ ............................................. B60P 3/06
[52] U.S. Cl. ........................................ 410/10; 410/12
[58] Field of Search ..................... 410/4, 7, 8, 9, 10, 410/11, 12, 19, 21, 22, 23, 96, 100, 101, 103; 296/65 A, 65 R; 280/289 WC

[56] References Cited

U.S. PATENT DOCUMENTS

| 3,955,847 | 5/1976 | Schiowitz . |
| 4,060,271 | 11/1977 | Williams . |
| 4,257,644 | 3/1981 | Stephens . |
| 4,389,056 | 6/1983 | Tenniswood . |
| 4,427,210 | 1/1984 | Wevers . |
| 4,492,403 | 1/1985 | Blomgren et al. . |
| 4,623,289 | 11/1986 | Apostolos . |

FOREIGN PATENT DOCUMENTS 615830 6/1935 Fed. Rep. of Germany ........ 410/21
2827377 1/1980 Fed. Rep. of Germany .......... 410/7

Primary Examiner—Johnny D. Cherry
Assistant Examiner—Frank H. Williams, Jr.
Attorney, Agent, or Firm—Ian C. McLeod

[57] ABSTRACT

An apparatus for securing a wheelchair (100) to the floor (200) of a vehicle is described. The apparatus includes a front attachment (A) and a rear attachment (B). The front attachment (A) includes a bar (15), buckle (14), belt (13) and hook (12) secured to a vehicle mounted plate (10). The rear attachment (B) includes a rear bar (26) with arms (28) mounted on the wheelchair and a rigid connection link (22) between the bar and a rear plate (20). The apparatus allows a greater number of wheelchairs to be positioned in the vehicle.

23 Claims, 4 Drawing Sheets

TIE DOWN APPARATUS FOR WHEELCHAIR

BACKGROUND OF THE INVENTION

1. Summary of the Invention

The present invention relates to an improved tie down apparatus for securing a wheelchair in a vehicle. In particular, the present invention relates to a tie down apparatus which has a short connection link to the floor of the vehicle at the rear of the wheelchair which avoids slippage of the wheelchair in the event of a sudden stop of the vehicle.

2. Prior Art

The prior art has described various types of hold down devices. Illustrative are U.S. Pat. Nos. 3,955,847 to Schiowitz; 4,060,271 to Williams; 4,257,644 to Stephens; 4,389,056 to Tenniswood; 4,427,210 to Wevers; 4,492,403 to Blomgren et al and 4,623,289 to Apostolos. All of the prior art devices are relatively complicated, do not adequately secure the wheelchair to the floor of the vehicle because of the use of flexible and sometimes elastic belts for holding the wheelchair against forward movement relative to the floor and/or are difficult to use for securing the wheelchair to the floor of the vehicle. Where front and rear tie down belts or chains securing the wheelchair to the floor of the vehicle are used, the belts or chains are in a direct line with the attachment means on the floor of the vehicle making the connection more likely to slip in the event of an accident. Further, the belts or chains are relatively long and require considerable room in the vehicle thus reducing the number of wheelchairs which can be carried in a given space in the vehicle. Further the lap belts for these prior art tie down apparatus are not secured directly to the floor of the vehicle in a metal to metal connection in the prior art apparatus.

OBJECTS

It is therefore an object of the present invention to provide a tie down apparatus for a wheelchair wherein the device occupies a minimum amount of room in the vehicle and provides an inflexible and inelastic connection link to the floor of the vehicle. Further it is an object of the present invention to provide a tie down apparatus which will not slip in the event the vehicle stops suddenly such as in an accident. Further still it is an object of the present invention to provide an apparatus which secures the lap belts to the floor of the vehicle in a direct connection. Further still, it is an object of the present invention to provide a tie down apparatus which is relatively simple and inexpensive to construct. These and other objects will become increasingly apparent by reference to the following description and the drawings.

In the Drawings

FIG. 1 is a side perspective view of the front and rear attachment A and B mounted on a wheelchair 100 and secured to the floor 200 of a vehicle.

FIG. 2 is a perspective front view of the wheelchair 100 and of the front attachment A shown in FIG. 1, particularly showing a hook 12, belt 13, buckle 14 and front bar 15 for tying down the front of the wheelchair 100 to the floor 200 of the vehicle.

FIG. 3 is a perspective rear view of the wheelchair 100 and the rear attachment B of the tie down apparatus shown in FIG. 1, particularly showing the rear hook 22a, connection link 22, bar 26 for typing down the rear of the wheelchair 100 to the floor 200 of the vehicle.

FIG. 4 is a front perspective view of a rachet type buckle 14 which tensions the belt 13 on the attachment A on the front of the wheelchair 100 to the floor 200 of the vehicle.

GENERAL DESCRIPTION

The present invention relates to an apparatus for securing a wheelchair to the floor of a vehicle wherein the wheelchair has a front and a rear and includes a frame means with front posts mounting spaced apart front wheels on front axle means and rear axle means mounted on the frame means supporting spaced apart rear wheels behind the front wheels which comprises: a front attachment means for securing the front of the wheelchair to the floor; and a rear attachment means for securing the rear wheelchair to the floor including (i) a rear bar means which can mount on the rear of the frame means; (ii) a connection link means having opposed ends with a rear hook means secured at one of the ends and attached to the rear bar means at the other end and with a hinge means intermediate the ends of the link means which folds on a horizontal axis; and (iii) a rear plate means with an opening for engaging the rear hook means, wherein the hook means, link means and rear bar means hold the wheelchair in position when the wheelchair is pulled in the forward direction by the front attachment means.

In particular the present invention relates to an apparatus for securing a wheelchair to the floor of a vehicle wherein the wheelchair has a front and a rear and includes a frame means with front posts mounting spaced apart front wheels on front axle means and rear axle means mounted on the frame means supporting spaced apart rear wheels behind the front wheels which comprises: a front attachment means for securing the front of the wheelchair to the floor including (i) a front bar means which mounts horizontally between the front posts and above the front wheels, (ii) a buckle means mounted on a belt means with a front hook means attached to the belt means and the belt means or the buckle means attached to the front bar means; and (iii) a front plate means to be mounted on the floor with an opening which engages the front hook means, wherein the belt means, front bar means and hook means allow the wheelchair to be pulled in a forward direction by the belt means to secure the wheelchair to the floor; and a rear attachment means for securing the rear of the wheelchair to the floor including (i) which can mount on the rear of the frame means; (ii) a connection link means having opposed ends with a rear hook means secured at one of the ends and attached to the rear bar means at the other end and with a hinge means intermediate the ends of the link means which folds on a horizontal axis; and (iii) a rear plate means with an opening for engaging the rear hook means, wherein the hook means, link means and rear bar means hold the wheelchair in position when the wheelchair is pulled in the forward direction by the front attachment means.

Preferably the front and rear attachment means are made of metal except for the front belts. Fiber reinforced plastics might be used for weight reduction, but are not preferred.

SPECIFIC DESCRIPTION

Figure 1:
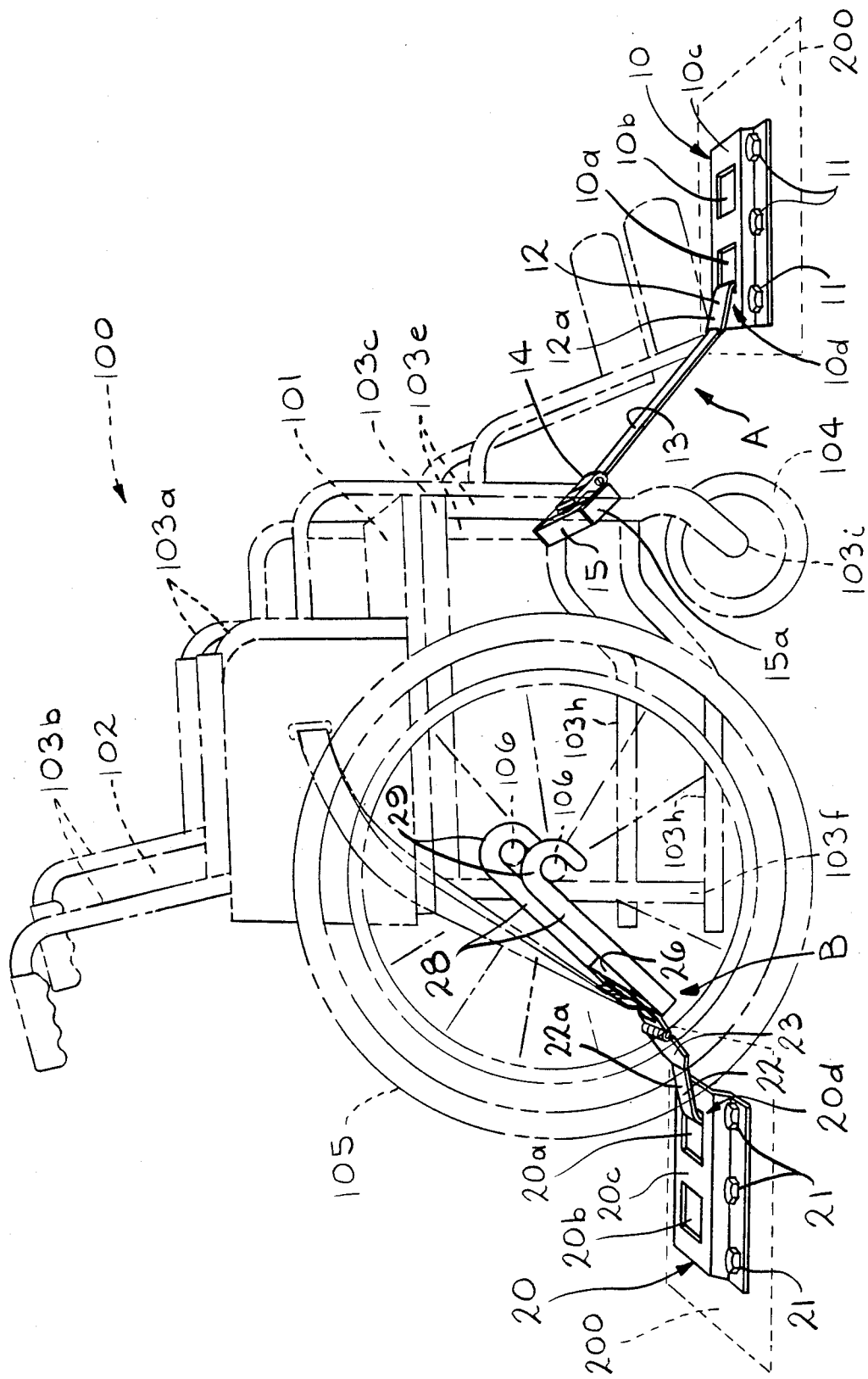
Figure 3:
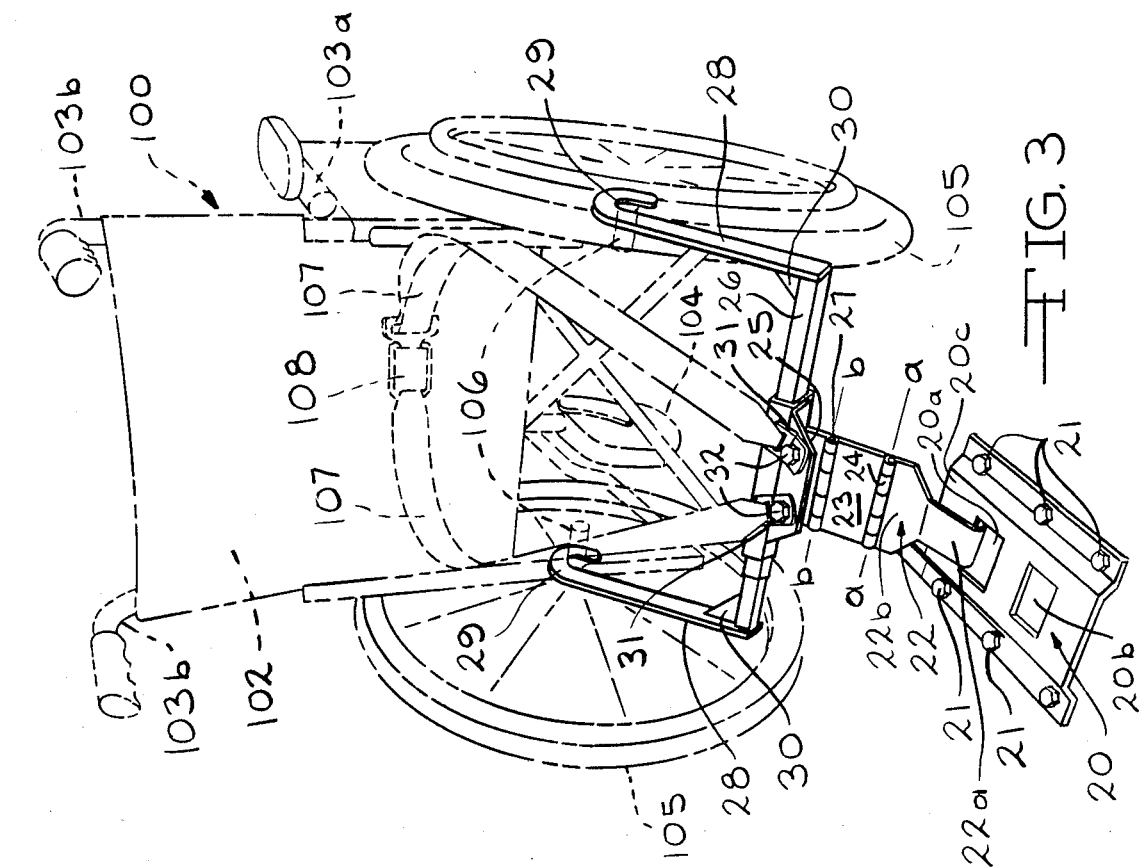
Figure 2:
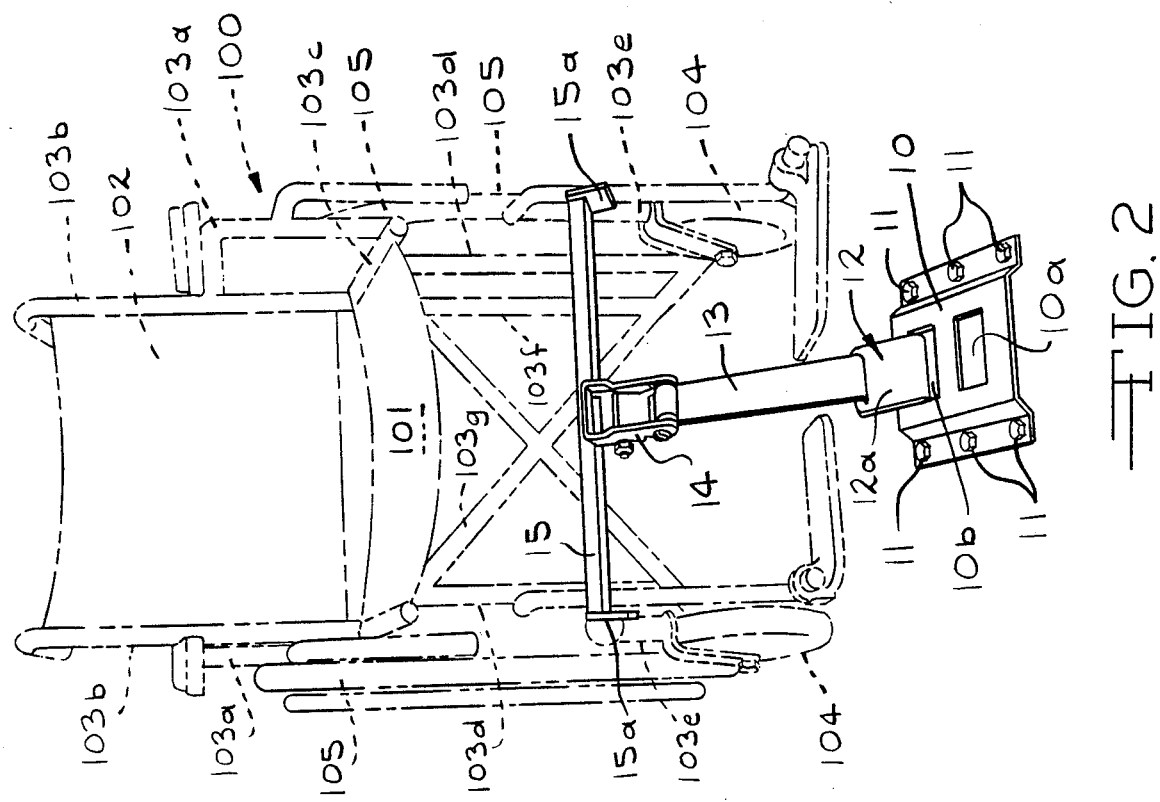

FIGS. 1 to 3 show a conventional wheelchair 100 including a seat 101 and backrest 102 supported by conventional frame members 103a to 103h. Frame members 103e are vertically oriented and support the small front wheels 104 on axles 103i. Frame members 103f support the larger rear wheels 105 on axles 106. The wheelchair 100 is to be secured to the floor 200 of a vehicle (not shown).

Mounted on the floor 200 is a front plate 10 secured in place by means of bolts 11 through openings (not shown) in plate 10 and through the floor 200. The plate 10 is provided with two openings 10a and 10b in a raised portion 10c of the front plate 10. A hook 12 is mounted in the opening 10a (or 10b) in plate 10. The hook 12 engages a lip 10d of the opening 10a so that the tang 12a of hook 12 is at a slight angle (20°) to the floor 200 of the vehicle. The belt 13 leads to a buckle 14 attached to a bar 15. The bar 15 has tabs 15a which hook around the frame member 103 which is vertically oriented. The buckle 14 is of a conventional rachet type and acts to tension and untension the belt between the bar 15 and the hook 12. The plate 10, hook 12, belt 13, buckle 14 and bar 15 provide a front attachment A for the wheelchair 100.

Rear plate 20 is mounted on floor 200 by means of bolts 21 through openings (not shown) in plate 20 and through the floor 200. The plate 20 is provided with two openings 20a and 20b in a raised portion 20c of the rear plate 20. A hook 22 is mounted in the opening 20a (or 20b) in plate 20. The hook engages a lip 20d of the opening 20a so that the tang 22a of the hook 22 is at a slight angle (20°) to the floor 200 of the vehicle so that the tang 22a of hook 22 acts as a lever arm pulling the attached link 23 towards the floor 200. The hook 22 has an upwardly projecting second tang 22b connected to the link 23 by a first hinge 24. The first hinge 24 pivots on an essentially horizontal axis a—a. The link 23 is connected to an extension 25 from a bar 26 through a second hinge 27 which pivots on an essentially horizontal axis b—b. Spaced apart arms 28 with curved portions 29 are mounted on the bar 26 and connect around axles 106. Gussets 30 support the arms 29 on the bar 26. Extension 25 supports connector 31 which are secured to the extension 25 by bolts 32. Lap belts 107 are secured to the connectors 31 with a buckle 108 adjacent the lap. The rear attachment B includes the plate 20, hook 22, link 23, rear bar 26, arms 28 and curved portions 29.

Figure 4:
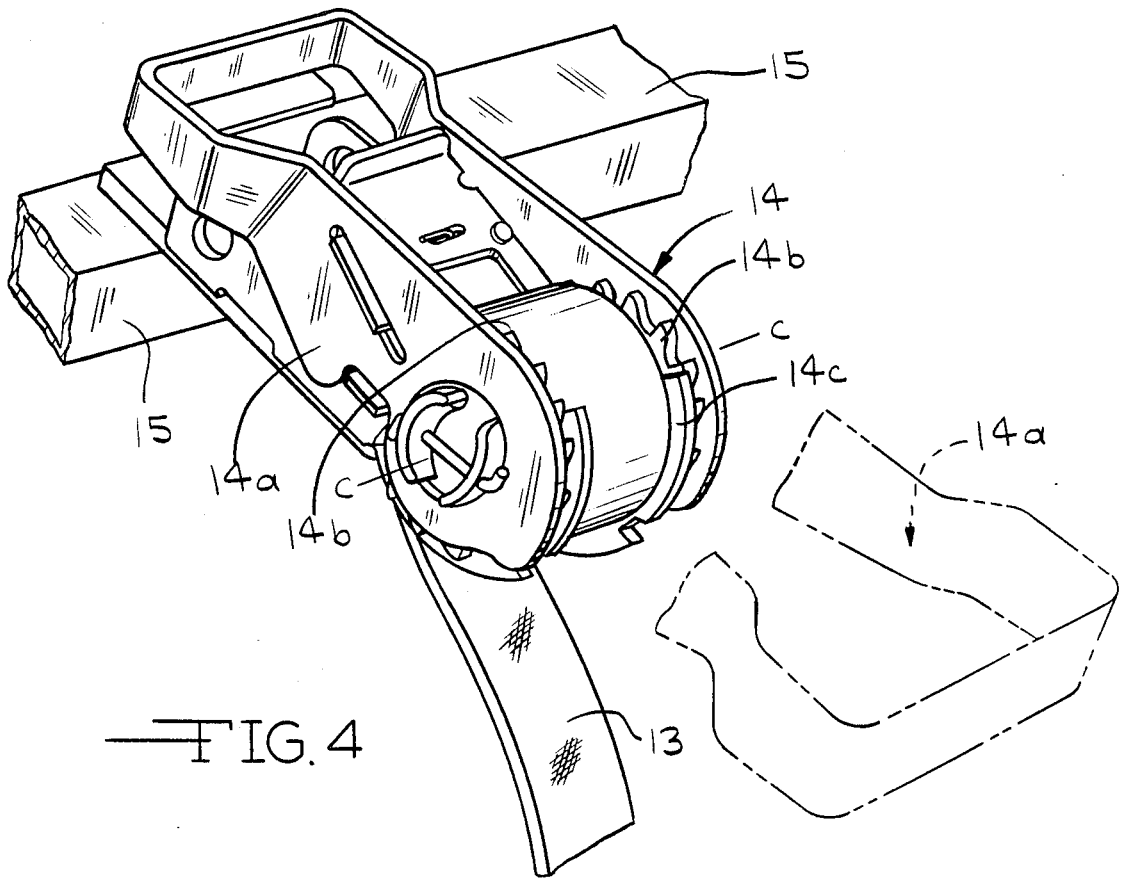

FIG. 4 shows the details of the conventional rachet buckle 14. Arm 14a moves in an arc to the position shown by the dotted lines. Rachet wheels 14b are turned by arm 14a so that the belt 14 rolls onto drum 14c as the drum 14c turns on axis c—c.

Figure 5:
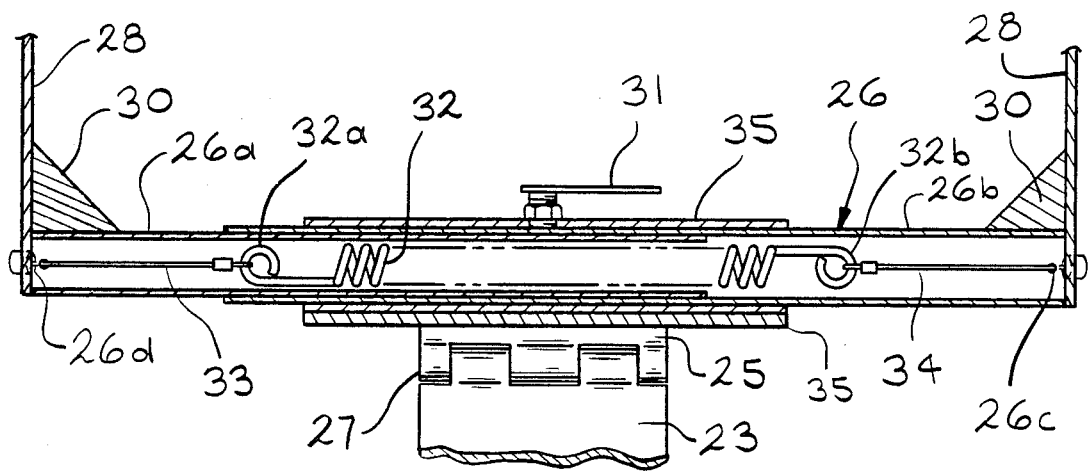
FIG. 5 is a cross-sectional view of the bar 26 which holds the rear attachment B to the wheelchair 100.
Figure 6:
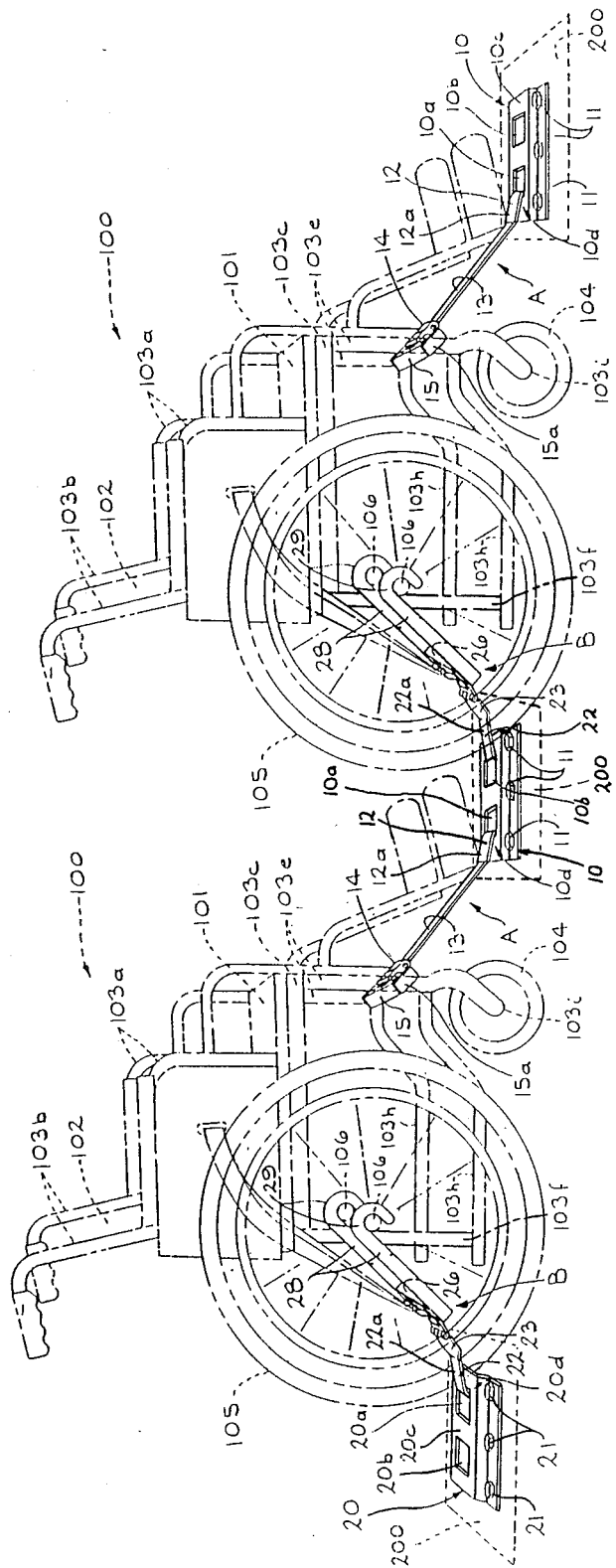
FIG. 6 is a front view of two wheelchairs 100 attached to a floor of a vehicle by the apparatus of the present invention.

FIG. 5 shows the rear bar 26 which has telescoping sections 26a and 26b. A spring 32 is mounted between the sections so as to tend to pull them together by means of wires 33 and 34 connected at the opposed ends 32a and 32b of the spring 32 and to opposed ends 26c and 26d of the sections 26a and 26b. The extension includes a hollow member 35 surrounding the bar 26 to secure the extension 25 in position.

In operation, the front bar 15 and rear bar 26 are mounted on the wheelchair 100. The hooks 12 and 22 are secured in openings 10a (or 10b) and 20a (or 20b), respectively. The belt 13 is then tightened by buckle 14 on drum 14c so that the wheelchair is secured to the floor 200 of the vehicle. Since the hooks 12 and 22 have tangs 12 and 22a are at a lesser angle to the floor 200 than belt 13 or second tang 22b, there is a significant component of force towards the floor 200 holding the chair 100 in position.

The short length including the rear hook 22, link 23 and extension 24 with hinges 24 and 27 allows the plate 20 to be close to the rear of the wheelchair. This combination allows close spacing of additional wheelchairs (not shown) in front of or behind the wheelchair 100. The openings 10b or 20b allow further wheelchairs to be secured to the floor 200. Thus a single plate 10 or 20 can be used for two chairs. This combination eliminates the need for a flexible belt and buckle at the rear of the chair which is conventional in the prior art and allows the wheelchair to be very rapidly (one minute or less) secured in the vehicle. The occupant can be removed from the chair by opening buckle 108 on belt 107 without removing the wheelchair from the vehicle.

It is intended that the foregoing description be only illustrative of the present invention and that the present invention be limited only by the hereinafter appended claims.

I claim:

1. An apparatus for securing a wheelchair to the floor of a vehicle wherein the wheelchair has a front and a rear and includes a frame means with front posts mounting spaced apart front wheels on front axle means and rear axle means mounted on the frame means supporting spaced apart rear wheels behind the front wheels which comprises:
   (a) a front attachment means for securing the front of the wheelchair to the floor including (i) a front bar means which mounts horizontally between the front posts and above the front wheels, (ii) a buckle means mounting a belt means with a front hook means attached to the belt means so as to tension the belt means between the front bar means and the front hook means; and (iii) a front plate means to be mounted on the floor with an opening which engages the front hook means, wherein the belt means, front bar means and hook means allow the wheelchair to be pulled in a forward direction by the belt means to secure the wheelchair to the floor; and
   (b) a rear attachment means for securing the rear of the wheelchair to the floor including
      (i) a rear bar, means which can mount on the rear of the frame means;
      (ii) a fixed length foldable connection link means formed of rigid members and having opposed ends with a rear hook means secured at one of the ends and attached to the rear bar means at the other end and with a hinge means intermediate the ends of the link means which folds on a horizontal axis; and
      (iii) a rear plate means with an opening for engaging the rear hook means so that the hook means acts as a lever arm to pull the wheelchair towards the floor of the vehicle, wherein the hook means, link means and rear bar means hold the wheelchair in position when the wheelchair is pulled in the forward direction by the front attachment means.

2. The apparatus of claim 1 wherein axle engaging means are provided on the rear bar means which mount around the rear axle means.

3. The apparatus of claim 1 wherein at least one of the front and rear plate means has two openings for the rear or front hook means, respectively, such that a more forward or rearward second wheelchair can be attached to the rear or front plate means in the same manner as the wheelchair.

4. The apparatus of claim 1 wherein the hinge means on the connection link means is a piano type hinge.

5. The apparatus of claim 1 wherein seat belts are attached to the rear attachment means so as to extend around the waist of an occupant of the wheelchair.

6. The apparatus of claim 1 wherein there are two of the hinge means which are spaced apart on the connection link means.

7. An apparatus for securing a wheelchair to the floor of a vehicle wherein the wheelchair has a front and a rear and includes a frame means with two vertically oriented front posts supporting spaced apart relatively small front wheels on front axle means and horizontally oriented rear axle means mounted on the frame means supporting relatively large spaced apart rear wheels behind the front wheels which comprises:
  (a) a front attachment means for securing the front of the wheelchair to the floor including
    (i) a front bar means which is telescopeable to mount horizontally between the front posts and above the front wheels with end tabs secured at opposed ends of the front bar means which engage the front posts,
    (ii) a buckle means attached to the bar means supporting a belt means with a front hook means attached to the belt means; and
    (iii) a front plate means to be mounted on the floor with an opening which engages the front hook means, wherein the belt means, front bar means and hook means allow the wheelchair to be pulled in a forward direction by the belt means to secure the wheelchair to the floor; and
  (b) a rear attachment means for securing the rear of the wheelchair to the floor including
    (i) a rear bar means such with spaced apart arm means having curved ends which mount around the rear axle means;
    (ii) a fixed length foldable connection link means formed of rigid members with a rear hook means mounted at one end and attached to the rear bar means at the other end with a hinge means intermediate the ends of the link means which folds on a horizontal axis; and
    (iii) a rear plate means with an opening for engaging the rear hook means so that the hook means acts as a lever arm to pull the wheelchair towards the floor of the vehicle, wherein the hook means, link means and rear bar means hold the wheelchair in position when the wheelchair is pulled in the forward direction by the front attachment means.

8. The apparatus of claim 7 wherein a spring means is provided in the rear bar means which telescopes the rear bar means together so that the arm means tend to be compressed together on the axle means.

9. The apparatus of claim 7 wherein the curved ends of the arm means mount around an upper portion of the axle means.

10. The apparatus of claim 7 wherein at least one of the front and rear plate means has two openings for the rear or front hook means, respectively, such that a more forward or more rearward second wheelchair can be attached to the rear or front plate means in the same manner as the wheelchair.

11. The apparatus of claim 7 wherein the hinge means is a piano type hinge.

12. The apparatus of claim 7 wherein seat belts are attached to the rear attachment means so as to extend around the waist of an occupant of the wheelchair.

13. The apparatus of claim 7 wherein there are two of the hinge means which are spaced apart on the connection link means.

14. The apparatus of claim 7 wherein the front and hook means engage the openings in the front and rear plate means so that the hook means act as a lever arm to urge the wheelchair towards the floor.

15. The apparatus of claim 7 wherein there are two of the hinge means which are spaced apart on the rigid connection means, and wherein the front and rear hook means engage the openings in the front and rear plate so that the hook means act as a lever arm to urge the wheelchair towards the floor.

16. The apparatus of claim 15 wherein seat belts are attached to the connection link means so as to extend around the waist of an occupant of the wheelchair.

17. The apparatus of claim 16 wherein there are first and second wheelchairs with the front wheelchair in front, at or behind the second wheelchair wherein at least one of the front and rear plate means has two openings for the rear or front hook means, respectively, such that the second wheelchair can be attached to one of the the rear and front plate means in front of or behind the front wheelchair.

18. The apparatus of claim 17 wherein the curved ends of the arm means on the rear bar means mount around an upper portion of the axle means.

19. The apparatus of claim 18 wherein a spring means is provided in the rear bar means which telescopes the rear bar means together so that the arm means tend to be compressed together when mounted on the axle means.

20. An apparatus for securing a wheelchair to the floor of a vehicle wherein the wheelchair has a front and a rear and includes a frame means with front posts mounting spaced apart front wheels on front axle means and rear axle means mounted on the frame means supporting spaced apart rear wheels behind the front wheels which comprises:
  (a) a front attachment means for securing the front of the wheelchair to the floor; and
  (b) a rear attachment means for securing the rear wheelchair to the floor including
    (i) a rear bar means which can mount on the rear of the frame means;
    (ii) a connection link means having opposed ends with a rear hook means secured at one of the ends and attached to the rear bar means at the other end and with a hinge means intermediate the ends of the link means which folds on a horizontal axis; and
    (iii) a rear plate means with an opening for engaging the rear hook means, wherein the hook means, link means and rear bar means hold the wheelchair in position when the wheelchair is pulled in the forward direction by the front attachment means, wherein a spring means is provided in the rear bar means which telescopes the rear bar means together so that the arm means tend to be compressed together.

21. An apparatus for securing a wheelchair to the floor of a vehicle wherein the wheelchair has a front and a rear and includes a frame means with front posts mounting spaced apart front wheels on front axle means and rear axle means mounted on the frame means supporting spaced apart rear wheels behind the front wheels which comprises:
 (a) a front attachment means for securing the front of the wheelchair to the floor including
  (i) a front bar means which mounts horizontally between the front posts and above the front wheels,
  (ii) a buckle means mounting a belt means so as to tension the belt means between the front bar means and the front hook means with a front hook means attached to the belt means and the belt means or the buckle means attached to the front bar means; and
  (iii) a front plate means to be mounted on the floor with an opening which engages the front hook means, wherein the belt means, front bar means and hook means allow the wheelchair to be pulled in a forward direction by the belt means to secure the wheelchair to the floor; and
 (b) a rear attachment means for securing the rear of the wheelchair to the floor including
  (i) a rear bar means which can mount on the rear of the frame means;
  (ii) a foldable connection link means having opposed ends with a rear hook means secured at one of the ends and attached to the rear bar means at the other end and with a piano type hinge means intermediate the ends of the link means which folds on a horizontal axis; and
  (iii) a rear plate means with an opening for engaging the rear hook means, wherein the hook means, link means and rear bar means hold the wheelchair in position when the wheelchair is pulled in the forward direction by the front attachment means.

22. An apparatus for securing a wheelchair to the floor of a vehicle wherein the wheelchair has a front and a rear and includes a frame means with two vertically oriented front posts supporting spaced apart relatively small front wheels on front axle means and horizontally oriented rear axle means mounted on the frame means supporting relatively large spaced apart rear wheels behind the front wheels which comprises:
 (a) a front attachment means for securing the front of the wheelchair to the floor including
  (i) a front bar means which is telescopeable to mount horizontally between the front posts and above the front wheels with end tabs secured at opposed ends of the front bar means which engage the front posts,
  (ii) a buckle means attached to the bar means supporting a belt means with a front hook means attached to the belt means; and
  (iii) a front plate means to be mounted on the floor with an opening which engages the front hook means, wherein the belt means, front bar means and hook means allow the wheelchair to be pulled in a forward direction by the belt means to secure the wheelchair to the floor; and
 (b) a rear attachment means for securing the rear of the wheelchair to the floor including
  (i) a rear bar means such with spaced apart arm means having curved ends which mount around the rear axle means;
  (ii) a connection link means with a rear hook means mounted at one end and attached to the rear bar means at the other end with a piano type hinge intermediate the ends of the link means which folds on a horizontal axis; and
  (iii) a rear plate means with an opening for engaging the rear hook means, wherein the hook means, link means and rear bar means hold the wheelchair in position when the wheelchair is pulled in the forward direction by the front attachment means.

23. An apparatus for securing a wheelchair to the floor of a vehicle wherein the wheelchair has a front and a rear and includes a frame means with two vertically oriented front posts supporting spaced apart relatively small front wheels on front axle means and horizontally oriented rear axle means mounted on the frame means supporting relatively large spaced apart rear wheels behind the front wheels which comprises:
 (a) a front attachment means for securing the front of the wheelchair to the floor including
  (i) a front bar means which is telescopeable to mount horizontally between the front posts and above the front wheels with end tabs secured at opposed ends of the front bar means which engage the front posts,
  (ii) a buckle means attached to the bar means supporting a belt means with a front hook means attached to the belt means; and
  (iii) a front plate means to be mounted on the floor with an opening which engages the front hook means, wherein the belt means, front bar means and hook means allow the wheelchair to be pulled in a forward direction by the belt means to secure the wheelchair to the floor; and
 (b) a rear attachment means for securing the rear of the wheelchair to the floor including
  (i) a rear bar means such with spaced apart arm means having curved ends which mount around the rear axle means;
  (ii) a connection link means with a rear hook means mounted at one end and attached to the rear bar means at the other end with a hinge means intermediate the ends of the link means which folds on a horizontal axis; and
  (iii) a rear plate means with an opening for engaging the rear hook means, wherein the hook means, link means and rear bar means hold the wheelchair in position when the wheelchair is pulled in the forward direction by the front attachment means, wherein a spring means is provided in the rear bar means which telescopes the rear bar means together so that the arm means tend to be compressed together on the axle means.

* * * * *